US006847935B1

(12) United States Patent
Solomon et al.

(10) Patent No.: US 6,847,935 B1
(45) Date of Patent: Jan. 25, 2005

(54) SYSTEM AND METHOD FOR COMPUTER-AIDED REBATE PROCESSING

(75) Inventors: Steven B. Solomon, Plano, TX (US); Kenneth R. Johnsen, Dallas, TX (US); Andrew F. Adams, Plano, TX (US); Juli C. Spottiswood, Dallas, TX (US); Michael D. Reynolds, Richardson, TX (US); Jack W. Doxey, Flower Mound, TX (US); Mason Wright, Coppell, TX (US); Kelly R. Melvin, Issaquah, WA (US); Barbara A. Minor, North Hollywood, CA (US)

(73) Assignee: Parago, Inc., Dallas, TX (US)

( * ) Notice: Subject to any disclaimer, the term of this patent is extended or adjusted under 35 U.S.C. 154(b) by 0 days.

(21) Appl. No.: 09/470,588

(22) Filed: Dec. 22, 1999

(51) Int. Cl.⁷ .......................... G06F 17/60; G06F 17/00
(52) U.S. Cl. ....................................................... 705/14
(58) Field of Search .............................. 705/1, 14, 16, 705/30, 35, 44; 463/40, 41, 42; 395/214

(56) References Cited

U.S. PATENT DOCUMENTS

| 4,672,377 A | * | 6/1987 | Murphy et al. ........ 340/825.34 |
| 5,056,019 A | * | 10/1991 | Schultz et al. ............... 364/405 |
| 5,729,693 A | * | 3/1998 | Holda-Fleck ............... 395/214 |
| 5,791,991 A | * | 8/1998 | Small .......................... 463/41 |
| 5,953,709 A | * | 9/1999 | Gilbert et al. ................. 705/14 |
| 5,956,695 A | * | 9/1999 | Carrithers et al. ............ 705/14 |
| 5,970,469 A | * | 10/1999 | Scroggie et al. .............. 705/14 |
| 6,330,544 B1 | * | 12/2001 | Walker et al. ................. 705/14 |

FOREIGN PATENT DOCUMENTS

WO    WO 97/23838    *   7/1997

OTHER PUBLICATIONS

Guglielmo, Connie, "Broad base goal of new promotion Some dealers wary of red tape tangles"; Oct. 24, 1989, MacWeek, v3, n38, pp 67–68.*

PR Newswire, "Catalina Marketing's Checkout Rebate Program Offers Simple Solutions to Traditional Rebate Programs", Feb. 14, 1998.*

Matthew Klein, "The Interactive Incentive", American Demographics, Oct. 1996.*

Regina Eisman, "Marketers' Newest Secret Weapon", Incentive, Jul. 1991.*

* cited by examiner

Primary Examiner—James W. Myhre
(74) Attorney, Agent, or Firm—Baker Botts L.L.P.

(57) ABSTRACT

A system is disclosed that provides computer-aided processing of a rebate on a product. The system includes a rebate processing center communicating over a network with a manufacturer, a distributor, and a consumer. The rebate processing center maintains a promotion table and a transaction table in order to facilitate processing of product rebates and to offer the consumer a choice of disbursement options.

30 Claims, 9 Drawing Sheets

FIG. 3

| Promotion ID | UPC | Manufacturer | Retailer | Geographic Target | Start Date | End Date | Units Sold | Rebates Claims | Breakage (%) | Disbursement Option 1 | Disbursement Option 2 | ... | Disbursement Option N |
|---|---|---|---|---|---|---|---|---|---|---|---|---|---|
| 5897 | 8458 | Widget Mfc, Inc. | Widget Sales | National | 12/12/1999 | 12/12/2000 | 100000 | 40000 | 60% | $50 Manufacturer's Rebate | none | ... | none |
| 5898 | 8792 | Widget Tec | Widget Sales | Dallas | 1/1/2000 | 1/1/2001 | 5000 | 2500 | 50% | $40 Manufacturer's Rebate | $60 Distributor's Gift Certificate | ... | none |
| ... | ... | ... | ... | ... | ... | ... | ... | ... | ... | ... | ... | ... | ... |
| 7203 | 1354 | Widget Tec | Widget Warehouse | TX, CA | 4/1/2000 | 1/1/2002 | 0 | 0 | 0 | $30 Manufacturer's Rebate | $40 Distributor's Gift Certificate | ... | $50 Manufacturer's Credit |

FIG. 4

| TRANSACTION ID | PROMOTION ID | NAME | ADDRESS | PERSONAL INFORMATION | PURCHASE INFORMATION | DISBURSEMENT OPTION | STATUS |
|---|---|---|---|---|---|---|---|
| 47315 | 5898 | JOHN SMITH | 4650 CANDY LANE | 50 YEAR OLD SMOKER | 3/14/00 FROM WIDGET SALES | $60.00 GIFT CERTIFICATE | PENDING VERIFICATION |
| 47316 | 5898 | BILL NABOR | 4651 CANDY LANE | 20 YEAR OLD COMPUTER HACKER | 2/17/00 FROM WIDGET SALES | $40.00 REBATE | AUTHORIZED |
| ... | ... | ... | ... | ... | ... | ... | ... |
| 59327 | 7203 | PHIL JACKSON | 823 MILL LANE | 50 YEAR OLD COACH | 4/20/01 | $30.00 REBATE | AWAITING MAIL IN FORM |

FIG. 5

```
                 Widget Manufacturers, Inc.
  Promotion ID: 08517
            UPC: [059280000200]
Product Description: [Widget Carrying Case]
   Manufacturer: [Widget Manufacturers, Inc.]
       Retailers: [Widget Warehouse
                   Widget Store]
Geographic Target: [Texas
                    California]

Start Date [January 1, 2000]   End Date [January 1, 2001]

Disbursement Option: 2                Value: [$50.00]
    ○ Cash Rebate                   Comment: [     ]
    ⦿ Gift Certificate
    ○ Manufacturer Credit
    ○ Custom
         [First] [Previous] [Next] [Last]

[Cancel] [Enter Promotion]
```

FIG. 6

```
Choose A Product
              Search Results for: Widget

| Product/Manufacturer      |
        | 5 Port Widget/WMI         |
        | 10 Port Widget/WMI        |
        | Widget Carrying Case/WMI  |
        | Widget Adapter/WidgeTech  |

New Search [                ]  [Search]

Access Product Index  [Go]
```

Fill Out Your Information

Widget Carrying Case
*this item must be purchased between 1-1-2000 and 1-1-2001

- First Name
- Last Name
- Address
- City
- State / Zip
- Phone
- Email
- Age — optional
- Occupation [High-tech ▼] optional How did you hear about this rebate? [This web site ▼] optional

- Purchase Date / Store
- Purchase Price / Location

How would you like to receive your rebate?

- ○ $30.00 rebate
- ○ $50.00 gift certificate to Widget Warehouse
- ○ $60.00 credit on Widget products
- ○ 3 year extended warranty Click 'Next' to proceed. [Next]

*FIG. 7*

Joe Smith
4600 Candy Lane
Dallas, TX 75201
Transaction ID:100000257 ← 82

 ← 140 place stamp here

Forward [Department No:745]
Forward Rebate
P.O. BOX 9018
COPPELL, TX-75019
USA

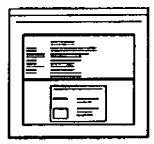

Rebate Value: $100.00
Valid Dates: 11-1-1999 to 1-31-2000

Card Scan Exec/Palm Organize
This item must be purchased between 11-1-1999 and 1-31-2000 in order to process a rebate.

Serial Number:

| tape original register receipt here | tape UPC symbol here |

RETURN TO

 HOW2.COM

RETURN TO

SHOP&SAVE
REBATES
HEADQUARTERS

Widget Manufacturers, Inc.
Promotion Status
Widget Accessory Promotion
5-4-2000

62

Promotion ID: 08517
Manufacturer: Widget Manufacturers, Inc.
Start Date: 1-1-2000   End Date: 1-1-2001

| Product ID | Product Description |
|---|---|
| 2587 | Leather Carrying Case |
| 2588 | Nagahide Carrying Case |

| Retailer | Units Sold | Rebates Claimed | Disbursement Option 1 | Disbursement Option 2 | Breakage (%) |
|---|---|---|---|---|---|
| WW | 10,000 | 3,000 | 2,000 | 1,000 | 70% |
| WS | 4,000 | 1,000 | 400 | 600 | 75% |
| total | 14,000 | 4,000 | 2,400 | 1,600 | 71.5% |
| Target Area | | | | | |
| TX | 6,000 | 2,400 | 1,000 | 1,400 | 60% |
| CA | 8,000 | 1,600 | 1,400 | 200 | 80% |
| total | 14,000 | 4,000 | 2,400 | 1,600 | 71.5% |

| Disbursement Option | Description | # Claimed |
|---|---|---|
| 1 | $50.00 Gift Certificate | 2,400 |
| 2 | $25.00 Cash Rebate | 1,600 |

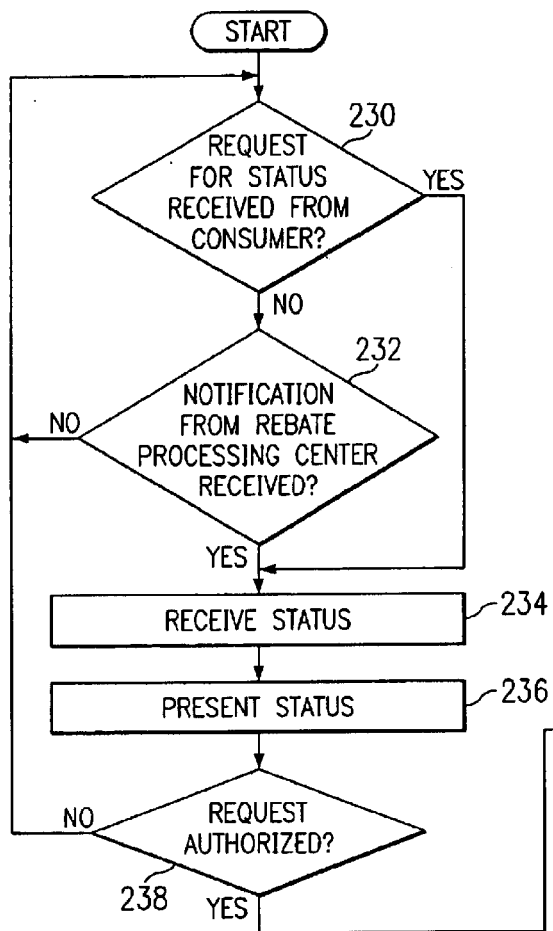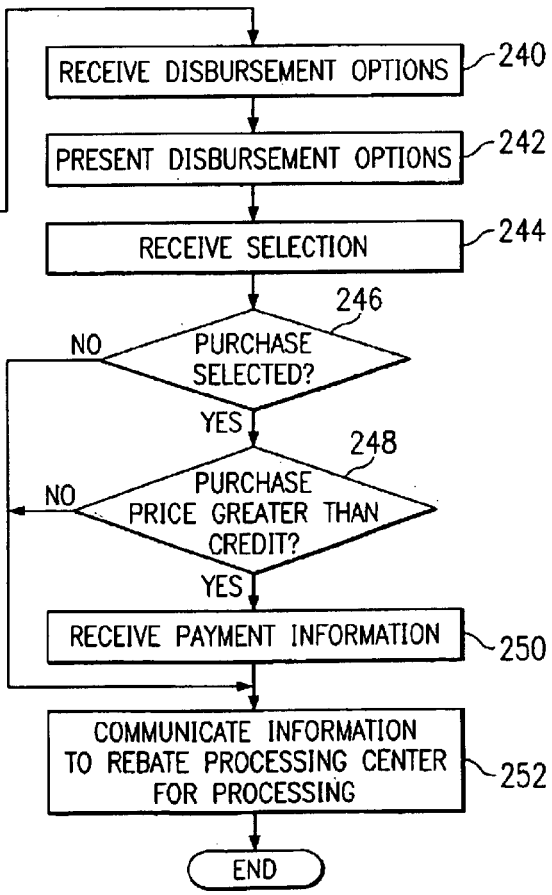
FIG. 12

SYSTEM AND METHOD FOR COMPUTER-AIDED REBATE PROCESSING

RELATED APPLICATIONS

This patent application claims priority under 35 U.S.C. § 119 to U.S. Provisional Patent Application Ser. No. 60/149,156 entitled Method and Apparatus for a Computer Network System Designed to Facilitate Rebate Fulfillment and Customer Information Gathering, filed Aug. 15, 1999, and is related to U.S. patent application Ser. No. 09/470,580 filed Dec. 22, 1999, entitled Rebate Processing System and Method Offering Selectable Disbursement Options, and U.S. patent application Ser. No. 09/470,582 filed Dec. 22, 1999 entitled Rebate Processing System and Method Providing Promotions Database and Interface.

TECHNICAL FIELD OF THE INVENTION

The present invention relates generally to rebate processing and more particularly to a system and method for computer-aided rebate processing.

BACKGROUND OF THE INVENTION

Manufacturers and service providers offer rebates as a financial incentive to increase sales. Rebates offer cash back to consumers who fulfill a set of requirements after purchasing a product bearing a rebate. By requiring post-purchase activities, the rebate offerer attempts to reduce the number of successful rebate claimants. Breakage occurs when a product bearing a rebate is sold, but the rebate is not successfully claimed. Because rebate programs offer the potential for breakage, manufacturers can offer a more valuable rebate compared to a straight reduction in product price. Thus, manufacturers establish procedures to maintain a sufficient rate of breakage and to prevent fraudulent rebate claims.

Consumers, in contrast, desire the quickest and easiest process for receiving their rebates. This creates a tension between the manufacturer's desire to maintain consumer satisfaction and the need to sustain a sufficient level of breakage in rebate programs.

SUMMARY OF THE INVENTION

In accordance with the present invention, a system and method for computer-aided rebate processing is provided which substantially eliminates or reduces disadvantages and problems associated with previous systems and methods. The present invention satisfies a need for a more consumer friendly method for processing rebates that maintains a breakage rate, prevents fraudulent claims, provides on-line status reporting, and provides a centralized rebate processing center for matching rebate promotions with qualified consumers.

According to one embodiment of the invention, a method, performed on a computer, for processing a rebate for a product identifies a product bearing a rebate, receives consumer information from a user, receives rebate information from a remote rebate processing center, and outputs a rebate request form. The method may also receive at least two disbursement options appropriate for the product and receive a selected one of the disbursement options from the user.

In accordance with another embodiment of the present invention, a method, performed on a computer, for processing a rebate for a product receives consumer information associated with a first transaction identifier, receives a second transaction identifier entered from a rebate request form, and accesses the consumer information if the first transaction identifier and the second transaction identifier match. The method also associates at least one promotion identifier with the first transaction identifier based on the consumer information, the promotion identifier indicating requirements of a promotion sponsor based on a product purchased. The method communicates a rebate authorization upon verifying that information contained in the rebate request form satisfies the requirements of the promotion.

The invention provides a number of technical advantages. The rebate processing system provides a user friendly interface, yet retains hurdles sufficient to maintain breakage. In addition, allowing the consumer to directly enter information may increase the accuracy of the information while permitting a reduction in the rebate processor's staff required for data entry. The rebate processing system also allows consumers to interactively submit information from a comfortable environment. Thus, consumers are more likely to provide a more exhaustive list of information, providing a greater opportunity for data mining. Furthermore, the interactive approach provides a dynamic process allowing for functions such as instantaneous targeted marketing of products related to previously purchased products. In addition, the present invention allows manufacturers, retailers, and other promotion sponsors to establish and monitor rebate promotions for qualified consumers. These promotions can provide a number of disbursement options so promotion sponsors can recapture a rebate by applying rebate credits to the sale of additional goods and services.

Other technical advantages of the present invention will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions, taken in conjunction with the accompanying drawings, in which:

FIG. 3 illustrates an exemplary promotion table maintained by the rebate processing center of FIG. 2;

FIG. 4 illustrates an exemplary transaction table maintained by the rebate processing center of FIG. 2;

FIG. 5 illustrates an interface for entering data to establish a promotion;

FIG. 6 illustrates an interface for receiving a product identifier from a consumer;

FIG. 7 illustrates an interface for entering data to initiate a rebate;

FIG. 8 illustrates an exemplary rebate request form used in the system of FIG. 1;

FIG. 10 illustrates an interface for viewing the status of promotions;

FIG. 12 is a flowchart of a method for communicating status and choosing disbursement options during rebate processing.

DETAILED DESCRIPTION OF THE INVENTION

The preferred embodiments of the present invention and its advantages are best understood by referring now in more detail to FIGS. 1–13 of the drawings, in which like numerals refer to like parts.

Figure 1:
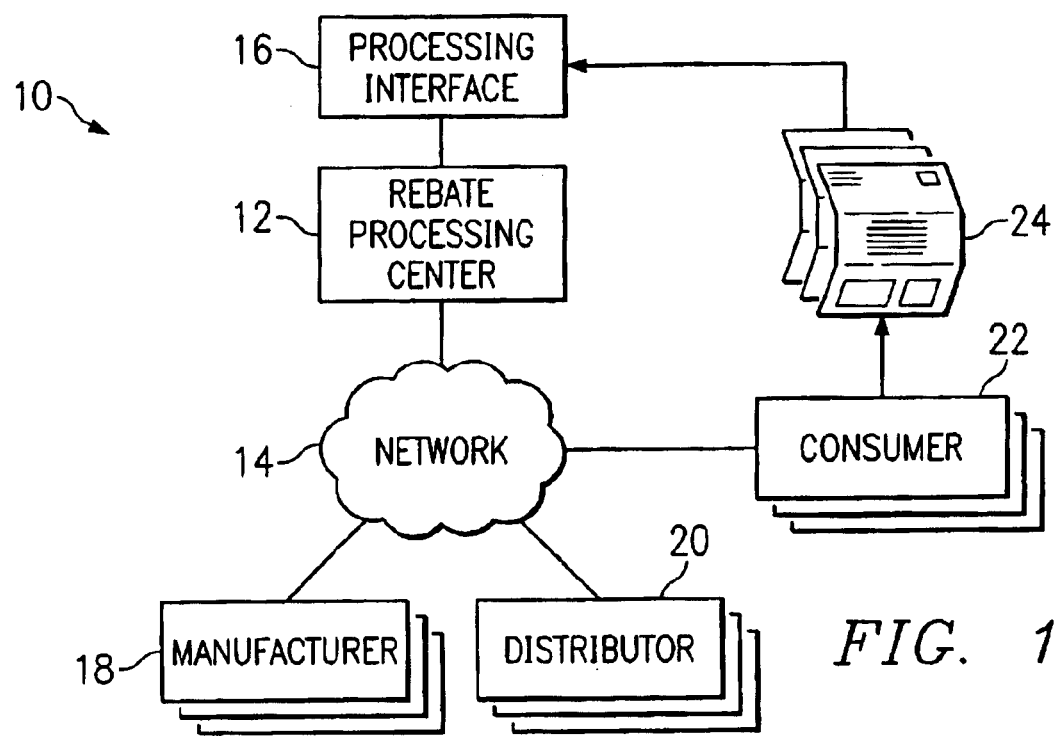
FIG. 1 is a block diagram illustrating a system for rebate processing in accordance with the teachings of the present invention.

FIG. 1 illustrates a system 10 for rebate processing that includes a rebate processing center 12 coupled to a network 14 and a processing interface 16. Rebate processing center 12 communicates with manufacturers 18, distributors 20, and consumers 22 using network 14. In general, rebate processing center 12 processes rebates for products purchased by consumers 22 using promotions established by manufacturers 18 and/or distributors 20.

Manufacturer 18 represents communications and/or processing equipment used or maintained by any retailer, manufacturer, service provider, or other producer of products, products being any type of goods or services offered for sale. Distributor 20 represents communications and/or processing equipment used or maintained by any intermediary, including retailers, who enables the sale of products of manufacturer 18 to consumer 22. For example, distributor 20 may operate physical stores or provide computer-based purchase of products through, for example, web-based electronic commerce. Consumer 22 represents communications and/or processing equipment used or maintained by any entity that purchases the goods or services of manufacturer 18 from distributor 20. Network 14 may be any collection and arrangement of hardware and/or software allowing electronic communications between components in system 10. For example, network 14 may be one or a collection of components associated with the public switched telephone network, local area networks, wide area networks, a global computer network such as the Internet, the World Wide Web, or any other suitable wireline or wireless communications technology. Throughout this description, manufacturer 18, distributor 20 and consumer 22 refer to communications and/or processing equipment or to the user of this equipment, as appropriate.

According to one embodiment, rebate processing center 12 contains a web server, network 14 is the Internet, and manufacturer 18, distributor 20 and consumer 22 represent web browsers or other suitable interface to communicate information with rebate processing center 12 using network 14. In addition, system 10 contemplates any method for delivering rebate request form 24 from consumer 22 to processing interface 16, such as mail delivery, courier delivery, or electronic image capture and communications technology. Once received in processing interface 16, the information from rebate request form 24 can be extracted using scanners, optical character readers, barcode readers, data entry operators, or any other suitable techniques for electronically capturing data from rebate request form 24.

In operation, rebate processing center 12 receives information concerning promotional from manufacturer 18. Consumer 22 purchases a product manufactured by manufacturer 18 from distributor 20 and then initiates the rebate process by identifying the product and submitting information to rebate processing center 12 using network 14. In a particular embodiment, consumer 22 also prints out rebate request form 24 and mails it to processing interface 16, and processing interface 16 provides the information from rebate request form 24 to rebate processing center 12. Rebate processing center 12 matches the information received from consumer 22 using network 14 with the information from rebate request form 24 and processes the rebate request. As shown, system 10 can include any number of manufacturers 18, distributors 20, consumers 22, and rebate request forms 24. Although not shown, system 10 may include a number of networked or stand-alone rebate processing centers 12 arranged by promotion sponsor, by geography, for land balancing or in other suitable configurations.

Figure 2:
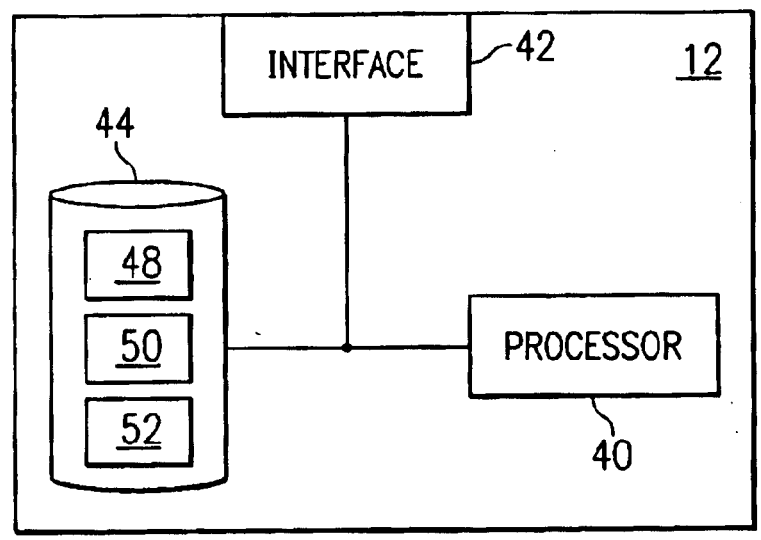
FIG. 2 illustrates an exemplary rebate processing center from the system of FIG. 1.

FIG. 2 illustrates rebate processing center 12 that includes a processor 40 coupled to an interface 42 and a memory 44. Interface 42 represents any suitable communications hardware and/or software for interfacing with local and/or remote locations. Memory 44 represents any one or combination of volatile or non-volatile, local or remote devices suitable for storing data, for example, random access memory (RAM) devices, read only memory (ROM) devices, magnetic storage devices, optical storage devices, or any other suitable data storage devices. Processor 40 represents any device or combination of devices, local or remote, operating alone or in concert through, for example, distributed processing, load balancing, threaded processing, or any other suitable processing techniques. Rebate processing center 12 can be implemented with any suitable controlling hardware, software, or combination of hardware and software.

In operation, processor 40 executes a program 48 stored on memory 44. Program 48 controls communication between interface 42 and other devices, such as manufacturer 18, distributor 20, consumer 22 and processing interface 16. Moreover, program 48 controls access to and population of a promotion table 50 and a transaction table 52, each stored in memory 44. Specifically, program 48 grants different users and classes of users varying levels of access to promotion table 50 and transaction table 52. Program 48 may be stored on any portion of memory 44 and may be executed using any suitable technique on processor 40. This may be on a device or combination of devices, local or remote, operating alone or in concert through, for example, distributed processing, load balancing, threaded processing, or any other suitable processing techniques.

Promotion table 50 maintains a list of promotions, rebate offers, discounts, or other things of value offered to consumers 22 (generally referred to as "promotions"), established and/or supported by manufacturers 18, distributors 20, or any promotion sponsor. Transaction table 52 maintains a list of rebate requests initiated by consumer 22, and associated information. The tables represent any collection or organization of information. In a particular embodiment, manufacturers 18, distributors 20 and consumers 22 access rebate processing center 12 over the World Wide Web to populate, edit, and/or access information maintained in promotion table 50 and transaction table 52. However, system 10 contemplates other techniques for interfacing, such as a proprietary interface or data entry staff.

In operation, rebate processing center 12 populates promotion table 50 with promotions and populates transaction table 52 with information relating to rebate requests from consumers 22. Rebate processing center also processes and authorizes rebate requests using network 14 to communicate with manufacturers 18, distributors 20, and consumers 22.

FIG. 3 shows an example of promotion table 50 maintained in memory 44. Promotion table 50 contains promotion information 60 organized where each row is a promotion 68 indexed by a promotion identifier 62. Although this example uses only numbers for promotion identifier 62, promotion table 50 supports alphanumeric characters, text strings, or any other combination of symbols for indexing specific promotions 68.

The columns of promotion table 50 are labeled according to promotion descriptors 64, but these labels may not be maintained in promotion table 50. Although the example shows a defined set of promotion descriptors 64, system 10 contemplates storing any combination of information in promotion table 50, for example, promotion identifier 62, universal product codes (UPC), product manufacturers, retailers, geographic targets of the promotion, start dates, end dates, the promotion sponsor, product names, product model numbers, product descriptions, product prices, household limits, authentication requirements, and rebate values. Moreover, individual fields in promotion table 50 may contain multiple values, for example, multiple retailers of a product or multiple products for a rebate. Also, multiple fields in different columns can be grouped, for example, each of several retailers offering promotion 68 can have different associated start and end dates. These fields can also contain statistical information updated by users of system 10. Even individual retail locations could be tracked according to units sold, breakage rate, or other useful metrics.

For example, manufacturer 18 maintains a units sold field, and rebate processing center 12 calculates and maintains a breakage rate field. Breakage refers to any event that prevents a rebate transaction from being completed, for example, denying based on bad verification materials such as receipts or UPC symbols, denying based on improper purchase dates or purchase price, or slippage from checks issued but not cashed. System 10 contemplates coordinating the receipt of information from consumer 22, manufacturer 18, and distributor 20 to provide information on breakage, since not all types of breakage can be determined only from consumer information 132. In addition, system 10 contemplates maintaining statistics representing specific types of breakage, such as slippage or percentage of denied rebate requests.

Disbursement options 66 are a subset of promotion descriptors 64 and contain values specifying the different forms of disbursements available for a particular promotion 68. A disbursement refers to any cash rebate, gift certificate, product discount, retail coupon, credit voucher, electronic credits, associated services, warranties, or other value provided to consumer 22 as a result of purchasing a product and successfully processing a rebate request. A credit voucher refers to any printed and/or electronic credit valid for purchasing products. Moreover, a single disbursement option 66 can be a combination, such as a gift certificate plus a backpack.

For example, promotion 68 defined in the first row of promotion table 50 offers only one disbursement option 66, a $50.00 rebate. However, in promotion 68 defined in the last row, three different disbursement options 66 are available: a $30.00 rebate from manufacturer 18, a $40.00 gift certificate from distributor 20, and a $50.00 manufacturer credit on future purchases. These examples are provided only to clarify the operation of system 10, which contemplates any number and combination of disbursement options 66 for each promotion 68.

Promotion table 50 provides a centralized bank of information relating to rebate bearing products. Manufacturer 18, distributor 20, and consumer 22 can access promotion information 60 through network 14 for myriad purposes. For example, distributors 20 can determine available promotions 68 in order to streamline marketing, determine performance statistics, or identify disruptions in the rebate process. Potential consumers 22 can browse through different rebates available on different products. Manufacturers 18 can use promotion table 50 to monitor a rebate's effectiveness, market products, and monitor retailers.

FIG. 4 shows an example of transaction table 52 containing transaction information 80 organized by rows, with individual rows indexed by a transaction identifier 82. Each row in transaction table 52 represents a request 86 by consumer 22 for a rebate on a product. Generally, a rebate contemplates the process or methodology that provides a disbursement to consumer 22 based on promotions 68 established by manufacturers 18 and distributors 20. Although each row contains a number for transaction identifier 82, this value may be alphanumeric characters, text strings, or any combination of symbols that can uniquely identify a row in transaction table 52.

The columns of transaction table 52 are labeled according to transaction descriptors 84, but these labels may not be maintained in transaction table 52. Although the example shows a defined set of transaction descriptors 84, system 10 contemplates storing any combination of information in transaction table 52, for example, transaction identifier 82, promotion identifier 62, personal information, purchase information, previous purchase information, request data, and consumer profiles. Personal information can include any data describing consumer 22, such as name, address, telephone number, age, e-mail address, occupation, salary, or other suitable demographic data. Purchase information can include any data describing the purchase, such as purchase date, location, product description, UPC, SKU number, price, images of rebate request form 24, images of UPC symbol, images of receipt, satisfaction, and intended use. Previous purchase information can include any data on past purchases, such as the information in purchase information, indexes to past rebate requests, and buying habits. Request data can track information detailing the specific request 86, for example, current disbursement option choice, and current rebate status. Rebate status provides an indication of the current state of a rebate request from consumer 22, for example, transaction initiated, awaiting rebate request form 24, processing information, awaiting verification, rebate request form 24 invalid, request denied, request approved, awaiting disbursement option 66 selection, fulfilling disbursement option 66, processing complete, or any other suitable status designation. Rebate processing center 12 accesses and updates rebate status in processing rebates requests, for example, for notification responsive to consumer 22 status request. Consumer profiles can include detailed data on consumer 22, such as buying habits, Internet access habits, credit card numbers, and display preferences. Transaction information 80 can also include fields for warranty information, allowing registration for warranties to take place contemporaneously with a request for a rebate. By giving complete flexibility, system 10 provides for virtually unlimited uses for transaction information 80.

Different components of system 10 populate different sections of transaction table 52. In a particular embodiment, consumer 22 interacts with rebate processing center 12 over the World Wide Web to enter and edit information relating to request 86. With this information, rebate processing center 12 assigns a transaction identifier 82, creates an entry in transaction table 52, and enters transaction information 80, such as promotion identifier 62. Using promotion identifier 62, system 10 associates entries in transaction table 52 to specific promotions 68 in promotion table 50.

For example, the second row of transaction table 52 contains promotion identifier 62 with the value of 5898. This corresponds to the second row in promotion table 50 of FIG. 3, which provides two different disbursement options 66. Referring again to FIG. 4, the second row contains a current disbursement option 66, which has been selected by consumer 22, that corresponds to one of disbursement options 66 from the associated row in promotion table 50.

In operation, rebate processing center 12 populates and maintains promotion table 50 and transaction table 52 through communications with manufacturer 18, distributor 20, and consumer 22. Rebate processing center 12 provides varying levels of access to promotion table 50 and transaction table 52 for users of system 10. These levels of access are tailored to provide for efficient rebate processing while maintaining system security. In addition, any communication with rebate processing center 12 can be cryptographically assisted, such that communications across network 14 are not subject to interception, fraud, or other forms of tampering.

In a particular embodiment, consumer 22 accesses, for viewing only, selected information from promotion table 50 using network 14 to communicate with rebate processing center 12. Consumer 22 browses through products associated with promotions 68, selects a rebate to request, and communicates information relating to a purchase. Rebate processing center 12 allows consumer 22 to populate, view, and maintain selected information from transaction table 52 through dynamic interfaces, such as web browsers. According to another embodiment, consumer 22 receives consumer information and rebate processing center 12 selects the appropriate promotion based on the information communicated from consumer 22. However, system 10 contemplates any suitable electronic communication interface for rebate processing center 12 to receive information for transaction table 52 from consumer 22.

Promotion table 50 and transaction table 52 also provide substantial benefits to the operation of system 10 and to each of the components of system 10. By analyzing promotion information 60 and transaction information 80, irregularities in the process can be identified and remedied. For example, a dip in the participation of consumers from distributor 20 could indicate a failure to properly market promotion 68. Simply failing to properly display a "tear pad" could be the root cause, however, centralized data allows for timely identification of problems. In addition, manufacturer 18 or distributor 20 can access transaction information 80 stored in transaction table 52 to personalize service to consumer 22 or to determine other information. Some examples are tracking of buying trends, information for targeted marketing campaigns, notification of product updates, recall notices, coupon campaigns, and surveys.

FIG. 5 illustrates a promotion information interface 100 that, in this embodiment, is customized for a particular manufacturer 18. System 10 can provide a similar interface for distributors 20 or other promotion sponsors to establish and maintain promotions 68. Interface 100 allows manufacturer 18 to populate promotion table 50 using network 14. For example, manufacturer 18 and/or distributor 20 may be provided passwords, login information, and customized interfaces to rebate processing center 12 to facilitate entry, review, and maintenance of promotions 68. When manufacturer 18 begins to create a new entry in promotion table 50, a unique number is automatically assigned for promotion identifier 62. The remaining fields in interface 100 correspond to promotion descriptors 64 from promotion table 50. For example, disbursement option entry fields 102 correspond to disbursement options 66, and permit entry of any number of different disbursement choices for a particular promotion 68. Thus, interface 100 generally allows promotion sponsors to populate promotion table 50 with promotion information 60 for rebate offers.

In a particular embodiment, interface 100 is a web page identified by a uniform resource locator (URL) and network 14 is the Internet. Manufacturer 18, using a web browser, can interactively create, view, and modify promotions 68 in promotion table 50. Individual employees of manufacturers 18 and distributors 10 provide login information, and rebate processing center 12 grants varying levels of access to ensure system security and data integrity. Moreover, system 10 contemplates a dynamic interface employing functionality such as hypertext links to provide interactive access to promotion table 50. Once promotion 68 has been entered, rebate processing center 12 can populate transaction table 52 with rebate requests identifying promotion 68.

FIG. 6 illustrates an example of a product search result interface 120 designed to enable consumer 22 to interactively select a product having a promotion 68. Rebate processing center 12 determines product search results 122 by searching promotion table 50 using a search string 124. Each of the products listed in product search results 122 represents an entry in promotion table 50 indexed by promotion identifier 62. To identify a particular promotion 68, consumer 22 selects a product from product search results 122, initiates a new search, or uses some other method for identifying a product having a promotion. Some examples of other techniques for identifying promotion 68 are entering a product description, entering a product's UPC, or searching lists of promotions 68. In a particular embodiment, product search result interface 120 is a web page identified by a uniform resource locator (URL) accessible using a web browser connected to the World Wide Web, and product search results 122 are hypertext links or pull-down menus allowing consumer 22 to identify a product using a computer mouse. Each of the products in product search results 122 has an associated product identifier. By "clicking" on the hypertext link of a particular product or selecting the product from a pull-down menu, consumer 22 initiates access to promotion table 50, where the product identifier allows rebate processing center 12 to determine associated promotion identifiers 62.

FIG. 7 illustrates a consumer information interface 130 that, in a particular embodiment, is displayed by rebate processing center 12 to consumer 22 after a particular product associated with promotion 68 has been identified. Consumer information interface 130 allows consumer 22 to enter consumer information 132. This includes an opportunity to select from disbursement options 66. Consumer information 132 consists of either all or a subset of transaction descriptors 84, and can include additional data. In a particular embodiment, rebate processing center 12 stores consumer information 132 in combination with transaction identifier 82 into transaction table 52. Thus, consumer information interface 130 allows consumer 22 to interactively populate transaction table 52 with transaction information 80 by identifying a product and entering consumer information 132.

Although consumer information interface 130 displays detailed promotion information 60 after a product has been identified, additional information may be required in certain circumstances to identify the applicable promotions 68. Thus promotion information 60 may be displayed to consumer 22 at any time before or after receiving consumer information 132. For example, certain promotions 68 may be dependent on the purchase price, purchase location, or other transaction information 80. For these promotions 68, consumer information interface 130 may dynamically update and display integrated promotion information 60 within interface 130 as consumer 22 enters consumer information 132.

Although there is no theoretical limit to the amount of information captured through consumer information interface 130, the system must balance the desire to obtain detailed consumer information 132 with the need to minimize the intrusion into the privacy of consumers 22. In a particular embodiment, rebate processing center 12 can dynamically display fields based on current selections, past selections, consumer profiles, and other appropriate factors. In addition, a number of fields can be optional, or the value of the rebate can be tied to the amount of information submitted or the willingness of consumer 22 to participate in future interactions. Thus the value of the rebate can be increased in consideration for the increased effort of consumer 22. In a particular embodiment, consumer information interface 130 is a web page identified by a URL accessible using a web browser connected to the Internet.

FIG. 8 illustrates an example of rebate request form 24 printed in a format suitable for mailing. Rebate request form 24 contains transaction identifier 82 in addition to a barcode 140 that encodes transaction identifier 82. Also, rebate request form 24 contains a destination address, selected portions of consumer information 132, and instructions for affixing a receipt, a UPC symbol, or other material verifying a product purchase. In a particular embodiment, rebate request form 24 is a trifold that, when folded in thirds, can be easily mailed. Upon completing information in FIG. 7, consumer 22 prints out rebate request form 24, affixes a receipt, a UPC symbol, and a stamp, and then mails form 24 to processing interface 16. Upon receipt of rebate request form 24, processing interface 16 scans barcode 140 and receives a notification indicating the authenticity of the attached receipt and UPC symbol. By requiring consumer 22 to mail form 24 with a receipt and a UPC symbol affixed, system 10 maintains breakage and prevents fraudulent claims.

In another embodiment, rebate processing center customizes the design of rebate request form 24 according to requirements of manufacturer 18, distributor 20, consumer 22, and/or promotion 68. For example, to preserve privacy, consumer 22. requests that rebate request form 24 contain only transaction identifier 82 with no other consumer information 132. Therefore, the mailing contains no identifiable personal data on consumer 22. In another embodiment, consumer 22 may simply record transaction identifier 82 on a mailing, such as a postcard contained in the product packaging.

Fraud poses a major concern driving the need for a mailing. However, system 10 envisions a secure technique for consumer 22 to verify the authenticity of a purchase, obviating the need for a paper transmittal. For example, consumer 22 transmits scanned images of receipts and UPC symbols to rebate processing center 12 using network 14. According to another embodiment, distributor 20 communicates a point of sale confirmation of a purchase to rebate processing center 12. These methods result in a "paperless" rebate process, yet by maintaining post purchase requirements such as data entry, system 10 provides opportunities for breakage. Once rebate processing center 12 has obtained all necessary information and has authorized a rebate, system 10 provides myriad processes for consumer 22 to realize the rebate.

Figure 9:
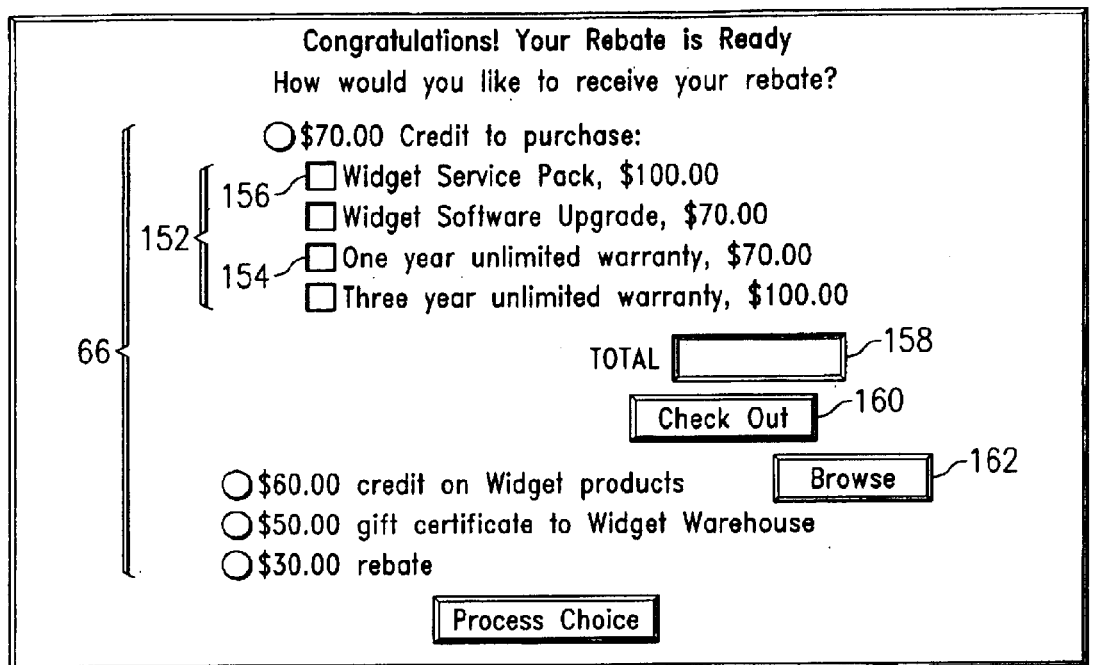
FIG. 9 illustrates an interface for selecting the disbursement method for an authorized rebate to a consumer.

FIG. 9 shows a disbursement options interface 150 that provides a method for consumer 22 to select one of disbursement options 66. In a particular embodiment, disbursement options interface 150 is a web page identified by a URL and is accessible using a web browser linked to the Internet. Consumer 22 accesses disbursement options interface 150 after receiving notification of authorization of request 86. This notification can be in the form of an email, a delivered letter, a response to a status request by consumer 22, or any other method for notification. In addition, rebate processing center 12 can notify consumer 22 of disbursement options 66 at any time during rebate processing and using any communications technique, for example, an email or a posted letter. Also, if consumer 22 has selected one of disbursement options 66, rebate processing center 12 can automatically authorize the release of the rebate upon authorization.

In a particular embodiment, consumer 22 is directed to access a web page displaying disbursement options interface 150. Consumer 22 then interactively accesses web pages through a dynamic interface according to consumer information 132, promotion 68, and other appropriate data. Thus consumer 22 interfaces with a custom-tailored web page to select one of disbursement options 66. In a particular embodiment, disbursement options interface 150 receives checking account information from consumer 22 and directly deposits the rebate into the account, or receives credit card information and credits the credit card account. According to another embodiment, disbursement options interface 150 prints out a personalized gift certificate or coupon valid for purchases of certain products. An identifier, such as a barcode on the certificate, allows the retailer to quickly authenticate the printout by accessing transaction table 52 through network 14.

Referring specifically to the example illustrated in FIG. 9, disbursement options interface 150 displays four primary selections for disbursement options 66 of an authorized rebate: a $70.00 purchase credit, a $60.00 manufacturer credit, a $50.00 distributor gift certificate, and a $30.00 cash rebate. If consumer 22 selects the $70.00 purchase credit, disbursement options interface 150 will enable the fields for purchase options 152. These check boxes allow consumer 22 to select products to buy using the purchase credit. For example, if consumer 22 selects a one-year warranty check box 154, a total field 158 will reflect a total price of $70.00. Consumer 22 then selects a checkout button 160 and, since the total is less than or equal to the purchase credit, consumer 22 will receive this selection after simply confirming the transaction.

In another example, consumer 22 selects one-year warranty check box 154 and a service pack check box 156. Total field 158 then reflects the total of all selected choices, $170.00. When consumer 22 selects check out button 160, a credit card purchase transaction is initiated to pay for the difference between the total price and the purchase credit. However, if the purchase credit is greater than the total price, a rebate of the remaining credit can be sent to consumer 22.

In another example, consumer 22 selects a browse button 162 associated with an option to receive a $60.00 credit. When consumer 22 selects browse button 162, rebate processing center 12 presents additional interfaces containing products that can be purchased using the $60.00 credit. These interfaces may be local or remote sites, such as an interface maintained by rebate processing center 12, a product sales site of manufacturer 18 and/or distributor 20, general product sales sites, listings of physical store locations, and/or any other appropriate interface for detailing available options for using the credit. In addition, the browsing interfaces may present customized interfaces based on consumer information 132 and/or promotion information 60.

The preceding examples and the values assigned for disbursement options 66 are meant only to clarify specific examples of particular embodiments. As previously discussed, system 10 contemplates providing any number and type of disbursement options 66. Moreover, system 10 contemplates distributing authorized rebates using disbursement options 66 irrespective of the method used to receive and process consumer information 132. Thus rebates may be fulfilled with varying disbursement options regardless of whether the rebate request was electronically initiated by consumer 22.

FIG. 10 illustrates an example of a promotion status interface 180 designed to enable a promotion sponsor to access statistical information describing promotion 68. Promotion status interface 180 contains an introductory section that includes selected portions of promotion information 60 identifying the particular promotion 68, such as promotion identifier 62. This section further includes a list of products covered under promotion 68. In addition, promotion status interface 180 contains two sections detailing statistical information of promotion 68. The first section shows units sold, rebates claimed, the distribution of the rebates claimed for each disbursement option 66, and the breakage rate, and displays this information for each retailer and geographic target area included in promotion 68. The second section in promotion status interface 180 shows descriptions and statistical information for each of disbursement options 66 available for promotion 68. In a particular embodiment, promotion status interface 180 is a web page customized for a particular promotion sponsor. While this example shows only a limited amount of statistical information, system 10 contemplates maintaining any statistical information useful for manufacturers 18, distributors 20, and/or consumers 22. Also, other status information interfaces may be provided containing any combination of information for any user of system 10. For example, consumer 22 may access a rebate status interface displaying the current status of rebate requests.

Figure 11:
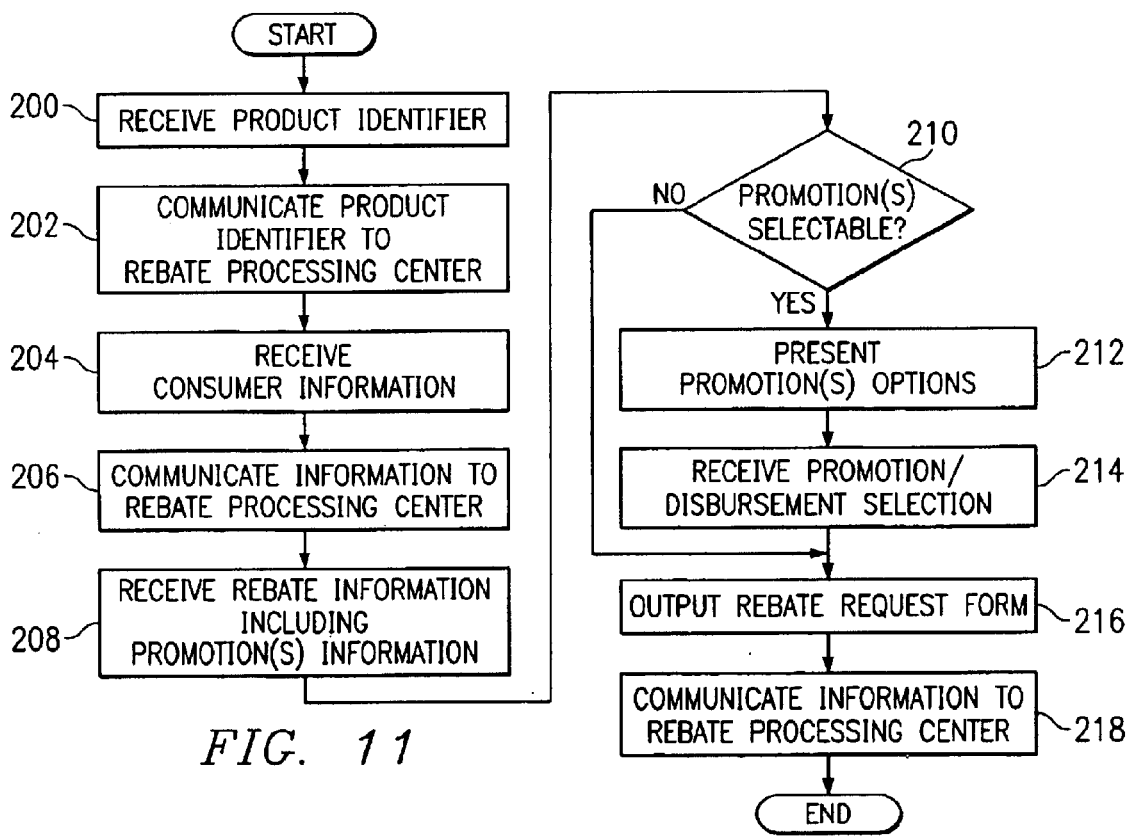
FIG. 11 is a flowchart of a method for initiating a rebate request.

FIG. 11 is a flowchart illustrating the operation of consumer 22 for initiating a rebate request. Consumer 22, using an interface such as product search result interface 120, receives a product identifier at step 200, the product identifier indicating a particular product having an associated promotion or promotions. Consumer 22 communicates the product identifier to rebate processing center 12 at step 202. In a particular embodiment, rebate processing center 12, using the promotion identifier, accesses promotion table 50 and uses promotion information 60 to customize an interface for receiving consumer information 132 from consumer 22.

Consumer 22, using an interface such as consumer information interface 130, receives consumer information 132 at step 204. Rebate processing center 12 may provide some or all of the information to consumer 22. For example, if consumer 22 has previously used system 10, rebate processing center 12 can customize an interface for consumer 22 using suitable personalization techniques based on prior transactions. Thus consumer 22 may partially or completely fill consumer information interface 130 with known information.

Consumer 22 communicates consumer information 132 to rebate processing center 12 at step 206. In a particular embodiment, rebate processing center 12 populates transaction table 52 with this information. Moreover, receiving and communicating consumer information 132 may be an interactive process. For example, consumer 22, upon detecting a deficiency in consumer information 132, presents a notice to the user identifying the deficiency and requesting proper information. Thus consumer 22 can reduce errors in receiving consumer information 132.

Consumer 22 receives rebate information at step 208; rebate information being any combination of data, promotion information 60, such as disbursement options 66, and/or transaction information 80. Based on promotion information 60 received from rebate processing center 12, consumer 22 determines whether there are multiple promotions 68 or disbursement options 66 to select from at step 210. If not, process flow skips to step 216. However, if there are multiple selections, consumer 22 presents these options to the user at step 212. These options may consist of multiple promotions 68 for the particular product identified and disbursement options 66 associated with each of these promotions 68. Consumer 22 receives a selection from the options presented at step 214.

Steps 200 through 214 represent a communication of promotion information 60 and transaction information 80 between consumer 22 and rebate processing center 12 that may take place in multiple transactions or through a single communication. Thus, system 10 contemplates any ordering or combination of these steps suitable for capturing the necessary information to initiate a rebate request. Moreover, in this embodiment, consumer 22 captures information at steps 210 through 214 designed to facilitate a more efficient and user-friendly process for obtaining a rebate on a product. System 10 contemplates capturing such information at any point during rebate processing, for example, after a rebate request has been approved. In addition, disbursement options 66 may be presented to consumer 22 irrespective of the method used to initiate the rebate request. For example, a user may submit a traditional mail-in rebate request indicating an email address. System 10, using this address, may then contact the user and provide disbursement options 66. Thus electronic submission of consumer information 132 by consumer 22 is not necessary for offering disbursement options 66 using consumer 22.

In addition, the ordering of steps, the interfaces presented by consumer 22, and the organization of information within these interfaces may be dictated wholly or in part by promotion information 60, currently known consumer information 132, and/or other appropriate information. For example, if consumer 22 selects a product associated with a particular promotion, an interface associated with that promotion could be displayed.

At step 216, consumer 22 outputs rebate request form 24. Rebate request form 24 may contain any combination of promotion information 60, transaction information 80, and/or other suitable information, and may present this information in any suitable format. Outputting this information can provide a user an opportunity to verify the accuracy of consumer information 132. In a particular embodiment, consumer 22 prints out rebate request form 24 in a format suitable for mailing. At step 218, consumer 22 communicates any changed or additional information, such as selections from disbursement options 66, to rebate processing center 12.

FIG. 12 is a flowchart illustrating a method for communicating status and selecting disbursement options 66. Consumer 22 determines whether a user has requested status at step 230. If so, process flow skips to step 234. If not, consumer 22 determines whether rebate processing center 12 has sent a status notification at step 232. This status notification may be any communication indicating status or that status is available, for example, an email with an embedded URL address linking to a status interface.

If consumer 22 has not received status notification, process flow returns to step 230. However, if consumer 22 detects a request for status from a user or status notification from rebate processing center 12, consumer 22 receives and presents the status information respectively at steps 234 and 236. Status information may be any information designed to apprise a user of system 10 of the current status of request 86. System 10 contemplates that consumer 22 may request and receive status at any time during rebate processing, and furthermore, rebate processing center 12 may initiate a notification of status to consumer 22 at any time. Moreover, a rebate transaction may be completed without consumer 22 ever requesting or rebate processing center 12 ever sending status information.

After receiving and presenting status, process flow returns to step 230 if a rebate request has not been authorized. However, if a rebate request has been authorized, consumer 22 receives disbursement options 66 from rebate processing center 12 at step 240 and presents these options at step 242. Depending on the applicable promotions 68, disbursement options 66, and the previous selections of consumer 22, some or all of the steps for selecting these options may be unnecessary. For example, if promotion 68 for the selected product contains only one disbursement option 66, no selection of options at steps 240 through 250 is required.

Consumer 22 receives selection(s) of disbursement options 66 from the user at step 244. Consumer 22 determines whether the user has selected to purchase additional products at step 246. This selection represents, for example, a selection to purchase products with rebate credit using the Internet. If a purchase has not been selected, process flow skips to step 252. However, if a purchase has been selected, it is determined whether the total purchase price is greater than the credit at step 248. In a particular embodiment, the total purchase price may represent the sum of all products selected to be purchased, and the credit may represent the sum of credits from multiple approved rebate requests of consumer 22.

If the purchase price does not exceed the credit, process flow skips to step 252. If the purchase price is greater than the credit, consumer 22 receives payment information from a user at step 250. This payment information may be any information for facilitating payment, such as credit card information, electronic funds transfer information, checking account information, an electronic Internet credit account, or an address to receive a bill. At step 252, consumer 22 communicates information such as disbursement option selections, purchase selections, payment information, and/or other pertinent information to rebate processing center 12.

Figure 13:
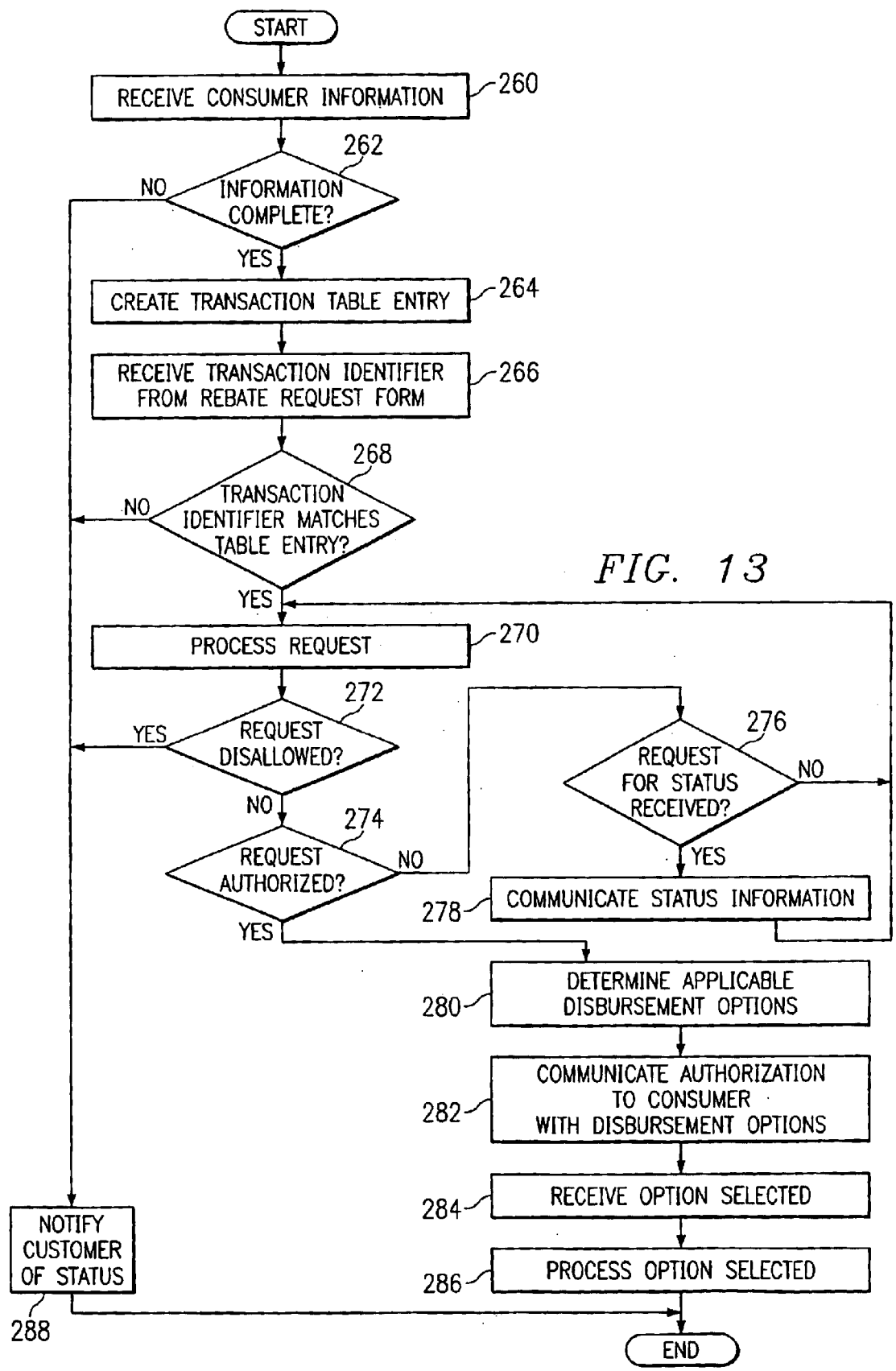
FIG. 13 is a flowchart of a method for electronically processing a rebate request.

FIG. 13 is a flowchart illustrating a method for rebate processing center 12 to process a rebate request. Rebate processing center 12 receives consumer information 132 from consumer 22 at step 260 and determines whether there is a deficiency with this information at step 262. If the information is not complete, rebate processing center 12 notifies consumer 22 of the status of the rebate request at step 288 and awaits further action by consumer 22. If the information is complete, rebate processing center 12 creates an entry in transaction table 52 at step 264. At step 266, Rebate processing center 12 receives transaction identifier 82 from rebate request form 24 using processing interface 16 and attempts to match this identifier with entries in transaction table 52 at step 268. This may include, for example, comparing transaction identifier 82 from the form and transaction identifiers 82 stored in transaction table 52. If the transaction identifier received does not match a table entry, rebate processing center 12 notifies consumer 22 of the status of the rebate request at step 288 and awaits further action by consumer 22. If the transaction identifier received from rebate request form 24 matches a table entry, rebate processing center 12 processes the rebate request at step 270.

Processing of the rebate request may be discontinued if the request is disallowed at step 272 or if the request is authorized at step 274. If it is determined that the rebate request is disallowed at step 272, rebate processing center 12 notifies consumer 22 of the status of the rebate request at step 288 and awaits further action by consumer 22. The rebate request may be disallowed for any suitable reasons, for example, missing information, failure to meet promotion requirements, or failure to submit proper verifying materials. If the rebate request is not disallowed, rebate processing center 12 determines whether the request is authorized at step 274. Any method for authenticating a rebate request may be used, for example, by receiving notification of the authenticity of a receipt and UPC symbol affixed to rebate request form 24. Moreover, in a particular embodiment, authorization is delayed to allow for further processing before a rebate is allowed.

If the rebate request is authorized, process flow skips to step 280. If not, rebate processing center 12 determines whether consumer 22 has requested status for a rebate request at step 276. In addition, rebate processing center 12 may also determine whether to communicate an indication of status to consumer 22 at step 276. For example, if all of the requirements for a promotion have been satisfied, rebate processing center 12 may notify consumer 22 of available disbursement options 66 and delay authorization until a selection is received. If no status is communicated, process flow returns to step 270. However, if a request for status has been received, or if rebate processing center 12 determines to notify of status, rebate processing center 12 communicates status information concerning the rebate request to consumer 22 at step 278, and then process flow returns to step 270.

Rebate processing center 12 contemplates any number of steps (e.g., steps 262, 268, 272, etc.) to halt rebate processing and await further actions by consumer 22. These steps provide opportunities for breakage, since many consumers 22 will fail to undertake the appropriate actions. This breakage represents any condition under which rebate processing is suspended pending further actions by a user. For example, failed communications between consumer 22 and rebate processing center 12, failure to receive proper verifying materials such as receipts or UPC symbols, or failure to meet the promotion requirements. These conditions may absolutely bar the request or may require remedial action to continue processing. Notifying consumer 22 at step 288 contemplates any method for indicating a problem in processing, and may terminate processing or provide consumer 22 an opportunity to correct the problem. Moreover, system 10 contemplates points of breakage at which rebate processing center 12 terminates processing and does not notify consumer 22 of status.

At step 280, rebate processing center 12 determines applicable disbursement options 66 for an authorized rebate. In a particular embodiment, this may also include determining multiple applicable promotions 68 based on the product purchased by consumer 22. Rebate processing center 12 communicates notification of rebate authorization to consumer 22 at step 282. In certain circumstances, this communication may also include disbursement options 66. Rebate processing center 12 receives the options selected by consumer 22 and processes those options respectively at steps 284 and 286. Processing the options selected may include any steps necessary for fulfilling disbursement options 66 selected by consumer 22. For example, if consumer 22 has selected to purchase products with a rebate credit, processing may include placing a request to ship the order or placing an order with an affiliated web site, a manufacturer, a catalog sales unit, a retailer, or any other distributor 20. In a particular embodiment, rebate processing center 12 uses data from consumer information 132 to place an order at distributor 20 and pays for the purchase using stored credit card information of consumer 22. Distributor 20 then makes the purchased product available for an expedited pick-up by consumer 22.

For each of the flowcharts, the ordering of steps, the information received, information communicated, processing steps, interfaces presented, and the organization of information within these interfaces may be dictated wholly or in part by promotion information 60, currently known consumer information 132, transaction information 80 and/or other appropriate information.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method, performed on a computer, for processing a rebate for a product, comprising:
   identifying a product bearing a rebate based on input received from a user;
   receiving consumer information from the user, the consumer information identifying a purchase of the product, wherein the purchase qualifies the user to request the rebate;
   communicating the consumer information to a remote rebate processing center from the computer using an electronic communications network;
   generating a rebate transaction identifier based on the consumer information, wherein the rebate transaction identifier enables the remote rebate processing center to identify the consumer information;
   receiving rebate information from the remote rebate processing center using the communications network, the rebate information comprising the rebate transaction identifier identifying the rebate for the product and the purchase of the product; and
   outputting a rebate request form comprising the rebate transaction identifier, the rebate transaction identifier for physical delivery to the remote rebate processing center.

2. The method of claim 1, wherein the rebate request form comprises a barcode encoding the rebate transaction identifier and instructions for affixing a receipt and a UPC symbol.

3. The method of claim 1, wherein outputting a rebate request form comprises printing the rebate request form in a format suitable for mailing.

4. The method of claim 1, wherein receiving rebate information from a remote rebate processing center further comprises:
   receiving at least two disbursement options for the user to receive the rebate; and
   receiving a selected one of the disbursement options from the user.

5. The method of claim 4, wherein the disbursement options comprise a cash rebate and a credit voucher valid for purchases at a limited scope of retail sites.

6. The method of claim 5, wherein the credit voucher comprises a selected one of a retailer gift certificate, a manufacturer credit voucher, and a credit valid for an Internet purchase.

7. The method of claim 5, wherein a cash value of the credit voucher is greater than the cash rebate.

8. The method of claim 1, further comprising:
   receiving authorization of a rebate comprising a purchase credit option;
   receiving a selection of the purchase credit option from the user;
   receiving purchase selections from the user;
   determining a total price of the purchase selections; and
   applying a credit value of the purchase credit option to the total price.

9. The method of claim 8, further comprising receiving credit card information if the total price exceeds the credit value.

10. The method of claim 1, further comprising:
    receiving authorization of a rebate comprising a purchase credit option;
    receiving a selection of the purchase credit option; and
    directing the user to a site for purchasing products using a credit value of the purchase credit option.

11. A system for use in rebate processing, comprising:
    a memory;
    a processor coupled to the memory; and
    a computer program stored in the memory, the computer program operable, when executed on the processor, to:
    identify a product bearing a rebate based on input received from a user;
    receive consumer information from the user, the consumer information identifying a purchase of the product, wherein the purchase qualifies the user to request the rebate;
    communicate the consumer information to a remote rebate processing center using a communications network;
    receive rebate information from the remote rebate processing center using the communications network, the rebate information comprising a rebate transaction identifier identifying the rebate for the product and the purchase of the product, wherein the remote rebate processing center generated the rebate transaction identifier in response to receiving the consumer information, and wherein the rebate transaction identifier enables the remote rebate processing center to identify the consumer information; and
    output a rebate request form comprising the rebate transaction identifier, the rebate transaction identifier for physical delivery to the remote rebate processing center.

12. The system of claim 11, wherein the rebate request form comprises a barcode encoding the rebate transaction identifier and instructions for affixing a receipt and a UPC symbol.

13. The system of claim 11, wherein the program is further operable to print the rebate request form in a format suitable for mailing.

14. The system of claim 11, wherein rebate information comprises at least two disbursement options for the user to receive the rebate and the program is further operable to receive a selected one of the disbursement options from the user.

15. The system of claim 14, wherein the disbursement options comprise a cash rebate and accredit voucher valid for purchases at a limited scope of retail sites.

16. The system of claim 15, wherein the credit voucher comprises a selected one of a retailer gift certificate, a manufacturer credit voucher, and a credit valid for an Internet purchase.

17. The method of claim 15, wherein a cash value of the credit voucher is greater than the cash rebate.

18. The system of claim 11, wherein the program is further operable to:
 receive authorization of a rebate comprising a purchase credit option;
 receive a selection of the purchase credit option from the user;
 receive purchase selections from the user;
 determine a total price of the purchase selections; and
 apply a credit value of the purchase credit option to the total price.

19. The system of claim 18, wherein the program is further operable to receive credit card information if the total price exceeds the credit value.

20. The system of claim 11, wherein the program is further operable to:
 receive authorization of a rebate comprising a purchase credit option;
 receive a selection of the purchase credit option from the user; and
 direct the user to a site for purchasing products using a credit value of the purchase credit option.

21. A method, performed on a computer, for processing a rebate for a product, comprising:
 receiving consumer information associated with a first rebate transaction identifier;
 receiving a second rebate transaction identifier entered from a rebate request form;
 accessing the consumer information in a database using the computer if the first rebate transaction identifier and the second rebate transaction identifier match;
 associating at least one promotion identifier with the first rebate transaction identifier based on the consumer information, the promotion identifier indicating requirements of a promotion sponsor based on a product purchased; and
 communicating a rebate authorization to a location indicated by the consumer information upon verifying that information contained in the rebate request form satisfies the requirements of the promotion.

22. The method of claim 21, wherein the consumer information comprises information entered electronically by a consumer at a remote computer.

23. The method of claim 21, further comprising:
 determining disbursement options based on the promotion identifier;
 communicating the disbursement options; and
 receiving a selected one of the disbursement options.

24. The method of claim 23, wherein the disbursement options comprise a cash rebate and a credit voucher.

25. The method of claim 24, wherein the credit voucher comprises a selected one of a retailer gift certificate, a manufacturer credit voucher, and a credit valid for an Internet purchase.

26. The method of claim 23, wherein the selected one of the disbursement options comprises a selection to purchase products using a credit, the method further comprising:
 receiving purchase selections, the purchase selections identifying a list of products to purchase with the credit;
 determining a total price of the purchase selections; and
 applying the credit to the total price.

27. The method of claim 26, further comprising receiving credit card information if the total price exceeds the credit.

28. The method of claim 23, wherein the selected one of the disbursement options comprises a selection to purchase products using a credit, the method further comprising communicating a list of sites for purchasing products using the credit.

29. The method of claim 21, further comprising notifying a consumer associated with the consumer information of a rebate processing status.

30. The method of claim 21, further comprising notifying the consumer comprises communicating the rebate processing status to the consumer electronically using the Internet.

* * * * *